(12) United States Patent
Wang et al.

(10) Patent No.: US 8,416,683 B2
(45) Date of Patent: Apr. 9, 2013

(54) METHOD FOR PROTECTING DATA SERVICE IN METROPOLITAN AREA TRANSPORT NETWORK

(75) Inventors: Juntao Wang, Shenzhen (CN); Zhiguo Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 10/591,207

(22) PCT Filed: Dec. 31, 2005

(86) PCT No.: PCT/CN2005/002419
§ 371 (c)(1),
(2), (4) Date: Nov. 14, 2006

(87) PCT Pub. No.: WO2006/069549
PCT Pub. Date: Jul. 6, 2006

(65) Prior Publication Data
US 2008/0025332 A1    Jan. 31, 2008

(30) Foreign Application Priority Data
Dec. 31, 2004    (CN) .......................... 2004 1 0101093

(51) Int. Cl.
*G01R 31/08*    (2006.01)
(52) U.S. Cl. ...................................................... 370/222
(58) Field of Classification Search .................. 370/217, 370/218, 219, 222, 223
See application file for complete search history.

(56) References Cited

U.S. PATENT DOCUMENTS 5,159,595 A    10/1992    Flanagan et al.
6,038,678 A  *  3/2000    Fukushima et al. .............. 714/4
(Continued)

FOREIGN PATENT DOCUMENTS

CN    1189269 A    7/1998
CN    1407763    4/2003
(Continued)

OTHER PUBLICATIONS

Papadimitriou et al., "Analysis of Generalized MPLS-Based Recovery Mechanisms (Including Protecting and Restoration)," Internet Draft, *Internet Engineering Task Force* (Nov. 7, 2002).

(Continued)

*Primary Examiner* — Mark Rinehart
*Assistant Examiner* — Mohammad Anwar
(74) *Attorney, Agent, or Firm* — Leydig, Voit & Mayer, Ltd.

(57) ABSTRACT

The present invention discloses a method for protecting a data service in Metropolitan Area Transport Networks, a work path for services transport is established between a source node and a work destination node of the services in the Metropolitan Area Transport Network, and the method includes: setting a protection destination node using the nodes except the work destination node, and establishing a protection path between the source node and the protection destination node to protect the services of the work path; detecting by the source node the failure state of the links of the work path and the protection path, and the failure state of the nodes in the links; detecting by the work destination node and the protection destination node the failure state of the links connecting themselves with data devices, respectively, and notifying the source node when there is the failure state; switching the data services of the work path to the protection path after the source node detects the failure state of the link of the work path or the failure state of the nodes in the link, or receives a failure state notice from the work destination node.

21 Claims, 4 Drawing Sheets

U.S. PATENT DOCUMENTS

| | | | |
|---|---|---|---|
| 6,088,141 | A | 7/2000 | Merli et al. |
| 6,711,125 | B1 | 3/2004 | Walrand et al. |
| 6,795,394 | B1 * | 9/2004 | Swinkels et al. ............... 370/222 |
| 6,829,215 | B2 | 12/2004 | Tornar |
| 6,829,347 | B1 * | 12/2004 | Odiaka .................... 379/220.01 |
| 6,947,377 | B1 * | 9/2005 | Shimano et al. .............. 370/228 |
| 7,313,087 | B2 * | 12/2007 | Patil et al. ..................... 370/217 |
| 7,315,510 | B1 * | 1/2008 | Owens et al. ................. 370/218 |
| 7,345,991 | B1 * | 3/2008 | Shabtay et al. ............... 370/221 |
| 7,450,497 | B2 * | 11/2008 | Trudel et al. ................. 370/224 |
| 7,477,594 | B2 * | 1/2009 | Saleh et al. .................... 370/225 |
| 2002/0078232 | A1 | 6/2002 | Simpson et al. |
| 2002/0186429 | A1 * | 12/2002 | Kaspit et al. .................. 359/110 |
| 2003/0048746 | A1 * | 3/2003 | Guess et al. .................. 370/219 |
| 2004/0057375 | A1 | 3/2004 | Shiragaki et al. |
| 2004/0179471 | A1 * | 9/2004 | Mekkittikul et al. ......... 370/218 |
| 2004/0218525 | A1 | 11/2004 | Elie-Dit-Cosaque et al. |

FOREIGN PATENT DOCUMENTS

| | | |
|---|---|---|
| CN | 100352223 C | 11/2007 |
| EP | 1 473 887 A2 | 11/2004 |
| WO | WO 2004036800 A2 | 4/2004 |

OTHER PUBLICATIONS

3$^{rd}$ Office Action in corresponding European Application No. 05848141.7 (Dec. 16, 2008).

Summons to attend oral proceedings pursuant to Rule 115(1) EPC in corresponding European Application No. 05848141.7 (Jun. 1, 2010).

Decision to Refuse a European Patent Application in corresponding European Application No. 05848141.7 (Nov. 25, 2010).

Written Opinion of the International Searching Authority in corresponding PCT Application No. PCT/CN2005/002419 (Apr. 13, 2006).

* cited by examiner

METHOD FOR PROTECTING DATA SERVICE IN METROPOLITAN AREA TRANSPORT NETWORK

This application is the U.S. National Phase of International Patent Application No. PCT/CN2005/002419, filed on Dec. 31, 2005, which claims priority to Chinese Patent Application No. 200410101093.3, filed on Dec. 31, 2004, all of which are hereby incorporated by reference.

FIELD OF THE TECHNOLOGY

The present invention relates to Metropolitan Area Transport Network, and more particularly, to a method for protecting data service in Metropolitan Area Transport Network.

BACKGROUND OF THE INVENTION

A Metropolitan Area Transport device, developed on the basis of devices of the traditional Synchronous Digital Hierarchy (SDH), has now incorporated such data access techniques as Ethernet and Asynchronous Transfer Mode (ATM), which is typically represented by the device of multi-service transport platform (MSTP). In a Metropolitan Area Transport device, the protection methods, such as Multiplex Section Protection (MSP), Sub-Network Connection Protection (SNCP), Path Protection (PP), and etc, may be adopted by an SDH service to implement the protection of network level. However, there is no protection method special for the Ethernet data services transported by the Metropolitan Area Transport Device, and the protection thereof has to rely on the methods adopted by the SDH service.

Figure 1:
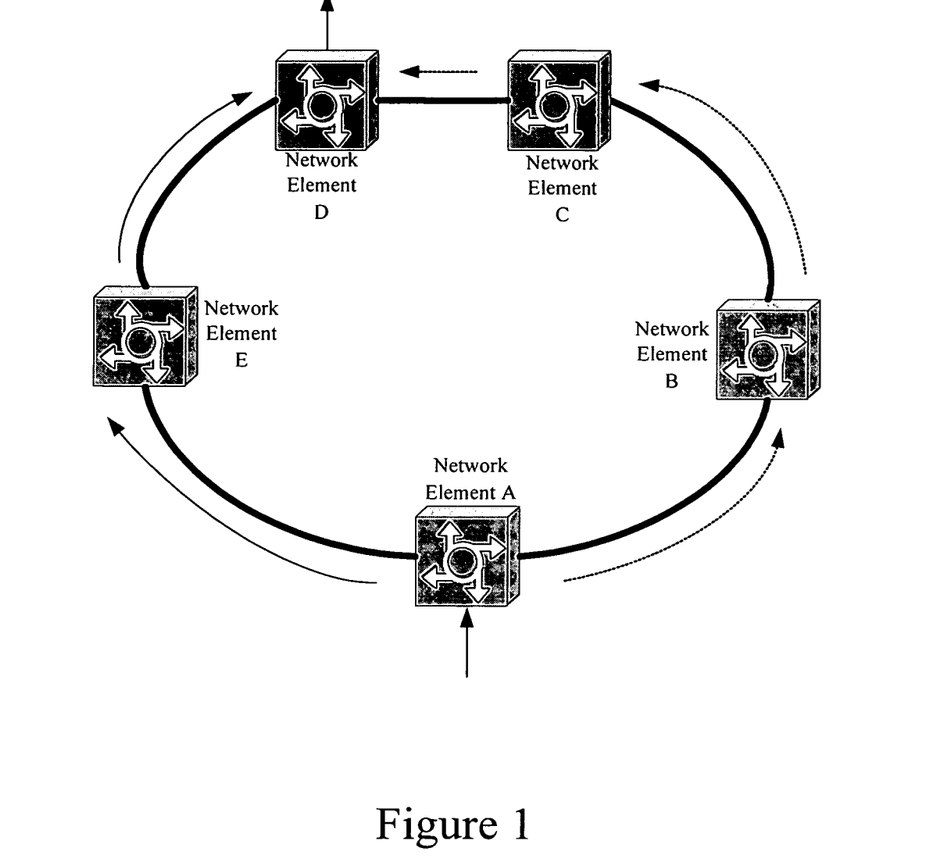
FIG. 1 is a schematic diagram illustrating the protection in case of the failure state of the link and the node using the traditional SDH protection method.

Along with the increasing significance of applications of data services in a Metropolitan Area Transport Network, the demand for higher security and reliability of some important data services has to be satisfied. The traditional SDH protection methods, however, can not serve this purpose, for they provide protection only when there is a failure in an intermediate link or at an intermediate node via which the service is transported rather than when there is a failure at the node of termination of a link or in the links connected with the data devices. FIG. 1 shows the method of traditional SDH protection:

Suppose that a service is uploaded to the Metropolitan Area Transport Network at Network Element A, then transported through Network Element E, and downloaded at Network Element D. In such a case, a traditional SDH protection method only works in the following three situations: there is a failure in the link between Network Element A and Network Element E, a failure in the link between Network Element E and Network Element D, or a failure in Network Element E. In FIG. 1, such a protection link is marked with a dotted arrowhead, which can not work if Network Element D fails or there is a failure in the data interface of the services in the downlink of Network Element D.

Figure 2:
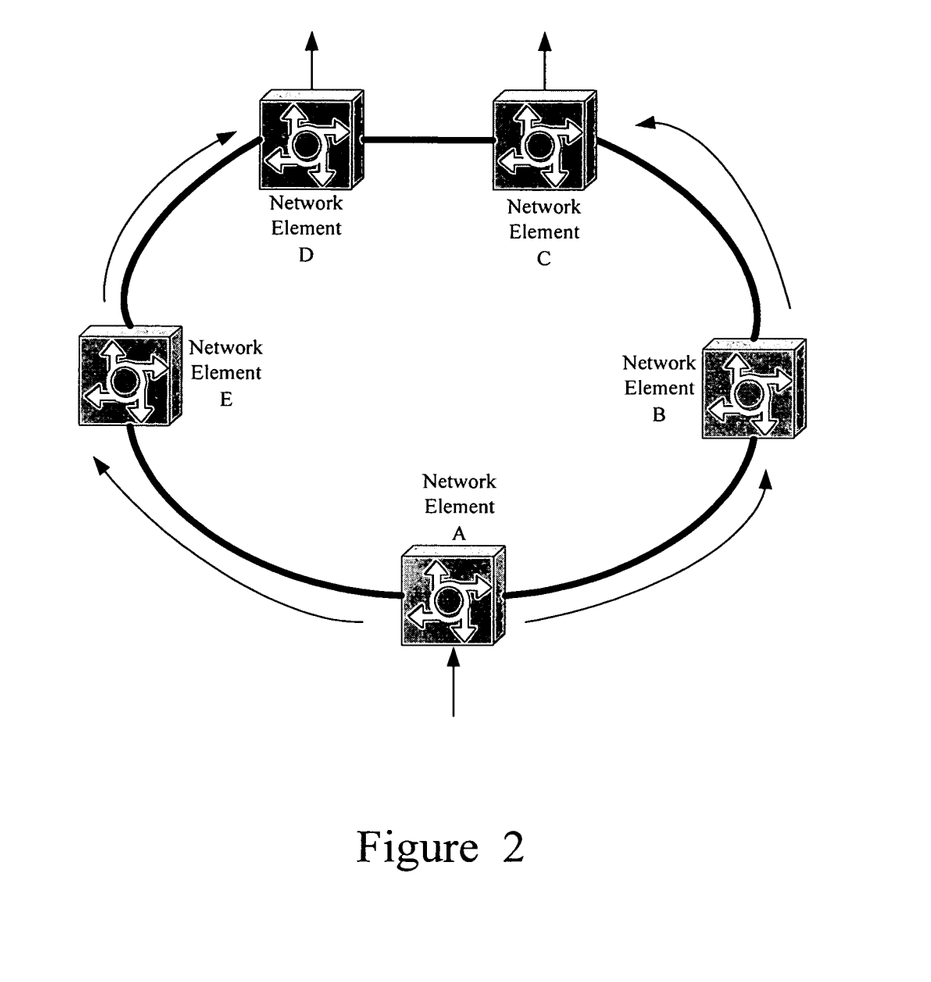
FIG. 2 is a schematic diagram illustrating the protection in case of the failure state of the link and the node provided by the Ethernet L2 switching service in the prior art.

In the Ethernet, the protection function in case of a failure in a Network Element or in the link between a Network Element and a data device connected with the Network Element could be implemented via the existing Ethernet Layer Two (L2) switching service, of which the scheme is shown in FIG. 2: data units in Network Element A, Network Element C and Network Element D are all configured with the Ethernet L2 switching service while Network Element C and Network Element D are connected to Network Element A, respectively, via different routes; in normal conditions, the interface of Network Element D serves as a work interface (a normal service interface, or the interface being protected), and the interface of Network Element C serves as a protection interface (a protection service interface, in charge of protecting the work interface), the work interface and the protection interface are connected to the data network, respectively, via identical devices or different devices. In normal conditions, to ensure the correctness of the service, it is required that the data devices connected with the protection interface shall not transport any message to the protection interface while messages have to be transported to the work interface. If there is a failure in Network Element D, in the link of the work interface or in the data device connected with the work interface, the data device connected with the protection interface will detect the failure; thereby switch the service to the protection interface to perform the protection function.

SUMMARY OF THE INVENTION

A method for protecting data service in a Metropolitan Area Transport Network to improve protection reliability of the protection method in the prior art, and to provide protection against a failure of an entire destination node in the Metropolitan Area Transport Network is provided.

The method above with a work path established between the source node and the work destination node of a service to transport the service in the Metropolitan Area Transport Network, includes the following steps:

establishing a work path for transporting a service between a source node and a work destination node of the service in the Metropolitan Area Transport Network;

setting a node other than the work destination node as a protection destination node;

establishing a protection path between the source node and the protection destination node for protecting the service in the work path;

the source node detecting a failure state of links of the work path and the protection path and a failure state of a node in the links of the work path and the protection path;

the work destination node and the protection destination node detecting respectively the failure of the links connecting themselves to a data device, if there is the failure, notifying the source node; and switching the data service in the work path to the protection path by the source node when the failure state of the link of the work path or the failure state of a node in the link is detected or a failure state notice of the work destination node is received.

The present invention may have the following advantages:

1. As the protection destination node of the protection path and the work destination node of the work path are different nodes, the work destination node and the protection destination node can be connected with the same data device, or with different data devices which are connected with each other, thus even when the link between the destination node and the data device or the data device is out of work, the service still continues.

2. The failure state detection of the link between the destination node and the data device and the failure state detection of the data device are carried out by the destination node. Therefore, neither of the detections nor the switching of the service depends on the data device, nor on the service type, which improves the protection reliability.

3. The source node detects the failure state of the link and the node in the Metropolitan Area Transport network, which makes it possible not to use the traditional SDH protection method.

4. When the work path runs well, extra services are transported in the protection path so that the bandwidth resource could be fully used.

EMBODIMENTS OF THE INVENTION

In an embodiment of the present invention, without adopting the traditional SDH protection method, the Metropolitan Area Transport device is employed to implement the protection in case of the failure state of the nodes and the links in the Metropolitan Area Transport Network and in case of the failure state of the link connecting the Metropolitan Area Transport device to the data device.

In the embodiment of the present invention, when the transport link and the node of the Metropolitan Area Transport Network both run well, the services are transported via the work path set between the source node and the work destination node; when the work path is out of work, the services are transported via the protection path set between the source node and the protection destination node, the protection destination node is one of the nodes except the work destination node in the Metropolitan Area Transport Network. The work destination node and the protection destination node are connected to the same data device, or to different data devices which are connected with each other. The transport network includes, an SDH network, a packet transport network based on the Ethernet, and a packet transport network based on Multiprotocol Label Switching (MPLS).

The source node of the service detects the failure state of the transport links of the work path and the protection path and the failure state of the nodes in the transport links of the work path and the protection path, while the failure state of the transport links connecting the data devices with the work destination node or the protection destination node are detected by the corresponding node, respectively, and the source node is notified when the failure state is detected. When the source node detects the failure state of the transport link of the work path or the failure state of a node in the transport link of the work path, or receives a failure state notice from the work destination node, the data services of the work path should be switched into the protection path. The failure state could be recognized by detecting the work states of physical-layer chips of the transport links. When the work path runs well, extra and less important services are transported in the protection path. Herein, the detection by the source node, the work destination node or the protection destination node could be implemented through the handshake information with the connected nodes, the Operation Administration and Maintenance (OAM) message or overhead of the SDH.

The service protection mode in the work path includes 1:1 protection mode and 1:n (n>1) protection mode, the 1:1 mode means that one protection path provides the protection for one work path, while the 1:n (n>1) mode means that one protection path provides the protection for multiple work paths, when the multiple work paths are out of work at the same time, only the services in the work path with the highest priority will be switched to the protection path.

The above two protection modes are hereinafter described in detail with reference to the accompanying drawings.

Figure 3:
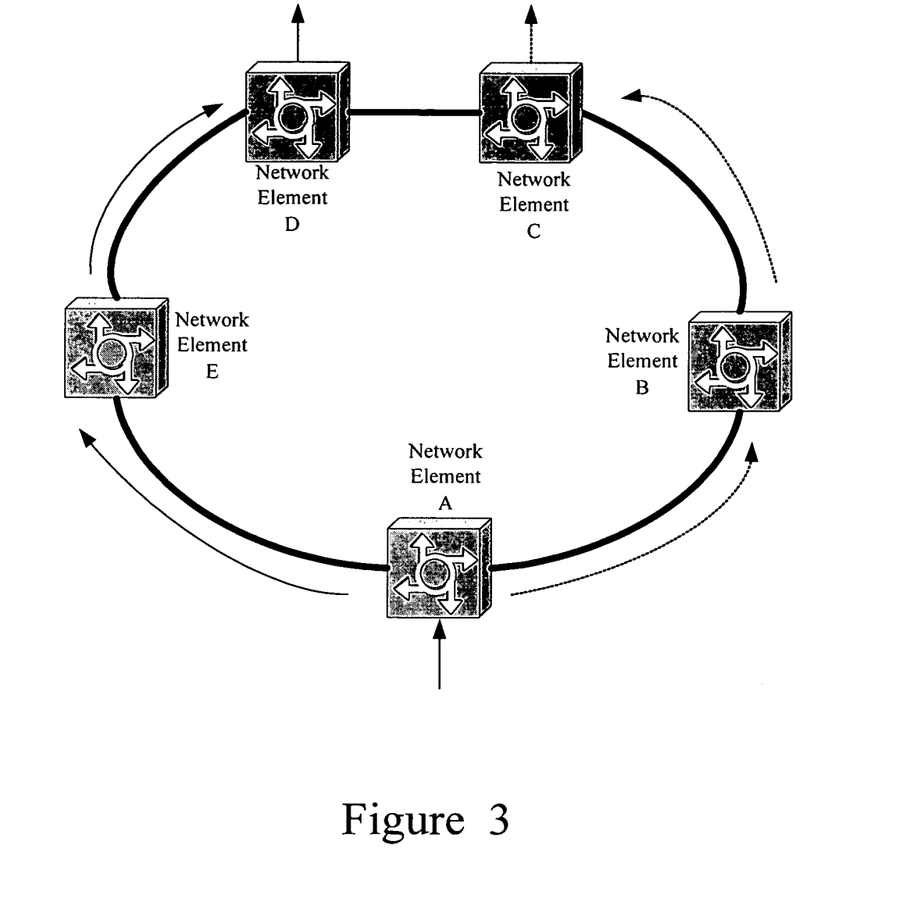
FIG. 3 is a schematic diagram illustrating the protection in accordance with an embodiment of the present invention in case of the failure state of the destination node.

FIG. 3 illustrates the 1:1 protection mode. As shown in FIG. 3, the process includes:

1. A work path (a normal service path, the path being protected) is set up between source node Network Element A, work destination node Network Element D, and Node E which is between the former two nodes, the protection path (the path protecting the work path) is also set up between the source node Network Element A and the protection destination node Network Element C, and Node B which is between A and C. In normal conditions, Network Element A sends the data services to work destination node Network Element D through the work path, then the data services is transported via a link from Network Element D to the data device connected with the Network Element D.

Network Element D and Network Element C could be connected either to the same data device, or to two different data devices which are connected with each other. In order to avoid service interruption caused by the failure state of the data devices, however, it is better for the work destination node and the protection destination node connect to different data devices which are connected with each other.

To make a full use of network bandwidth resources, when the work path between Network Element A and Network Element D runs well, some extra and less important services are transported in the protection path between Network Element A and Network Element C.

2. Network Element A is in charge of detecting the failure state of links of the work path in the Metropolitan Area Transport Network and the failure state of the nodes in the links of the work path; destination node Network Element D is in charge of detecting the failure state of the link connecting Network Element D with the data device, and Network Element C is in charge of detecting the failure state of the link between Network Element C and the connected data device. When there is a failure state or recovery from a failure state in the links or the nodes in the Metropolitan Transport Network, Network Element A could detect a failure state or a recovery from a failure state directly by an overhead alarm of the SDH, (e.g., Alarm Indication Signal (AIS), and Loss of Pointer (LOP)). When there is a failure state or recovery from a failure state in the links connecting Network Elements C and D to the data devices, Network Element C and D should notify Network Element A via signaling, the signaling includes, the Ethernet OAM signaling, the MPLS OAM signaling, and signaling of other protocol modes.

In order to avoid jittering of protection switching, an confirmation mechanism is adopted when the work destination node and the protection destination node notify the source node via the signaling, that is, the work destination node and the protection destination node send the failure state information repeatedly to the source node until an confirmation message is received from the source node.

3. After Network Element A detects a failure state in a Metropolitan Area Transport link or a failure of a node of the work path, or receives a notice that there is a failure state from Network Element D (that is, the work path turns unavailable), Network Element A switches the data services of the work path into the protection path, and stops the extra services in the protection path.

4. After Network Element A detects a recovery from a failure state in the Metropolitan Area Transport links or the nodes of the work path, or receives the notice of the recovery from a failure state from Network Element D (that is, the work path becomes available), the following two modes could be adopted:

The first mode: switch back the data services of the protection path to the work path, i.e., switch the data services transported between Network Element A and Network Element C to the link between Network Element A and Network Element D, while the protection path continues transporting the extra and less important services.

The second mode: after the service switching, set the protection path as the current work path, while the work path before the switching is set as the current protection path, that is, the transport path between Network Element A and Network Element C is used as the current work path, and the transport path between Network Element A and Network Element D is used as the current protection path. Thus, Network Element D becomes the current protection destination node while Network Element C becomes the current work destination node. Network Element A will not carry out switching even when it detects the recovery from the failure state of the transport path between itself and Network Element D, or receives a notice of the recovery from the failure state from Network Element D. Only when it detects a failure state of the current work path or receives a failure state notice from the Network Element C once again will Network Element A switch the data services transported between itself and Network Element C to the transport path between Network Element A and Network Element D, and the process repeats in such a way.

Figure 4:
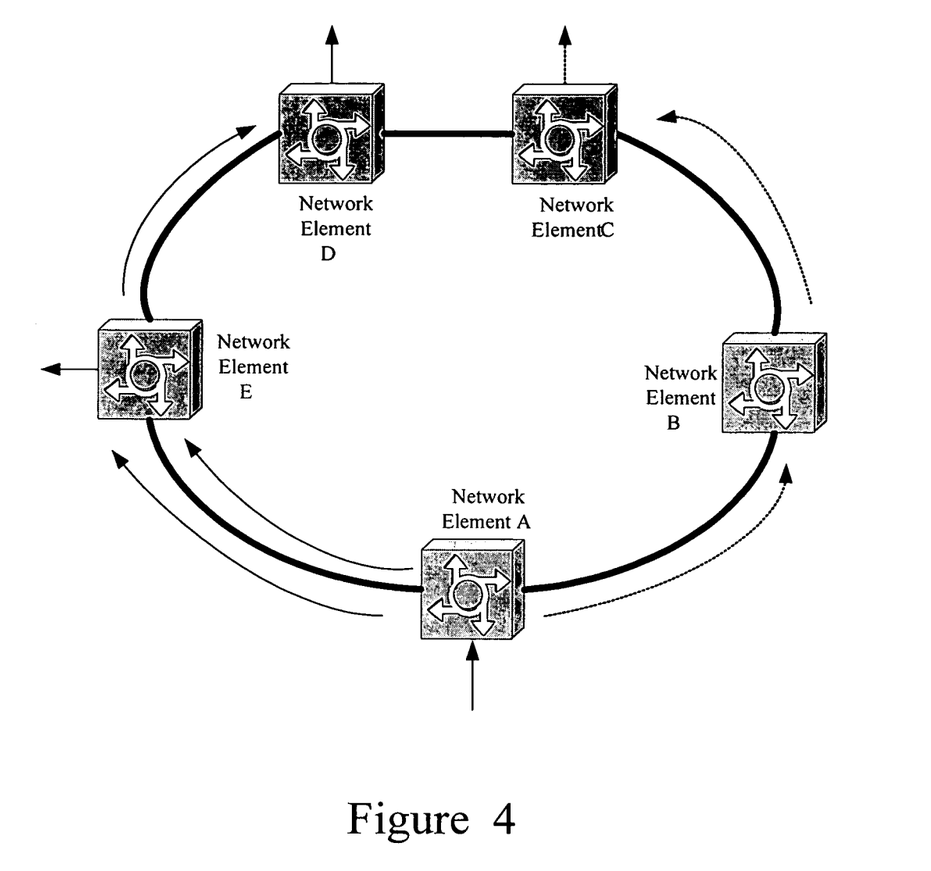
FIG. 4 is a schematic diagram illustrating the protection in accordance with another embodiment of the present invention in case of the failure state of the link between the destination node and the data device.

As shown in FIG. 4, the process of the 1:n (n>1) protection mode that is adopted to avoid occupying too much bandwidth of the protection path includes:

1. As needed in a practical network application, there may be in Network Element A multiple services connected to a data device via multiple network nodes (as Network Element D and Network Element E shown in the Figure, there may be more than 2 nodes in the practical application), therefore, it is necessary to establish on Network Element A multiple work paths (normal service paths being protected), respectively, and one protection path (the path protecting the work paths). In normal conditions, Network Element A sends the services to the work path. Since there is only one protection path to protect only one work path, it is necessary to setup priorities for the work paths such that, when there are failure state in multiple work paths at the same time, the data service of the work path with the highest priority could be switched to the protection path. Meanwhile, to make a full use of network bandwidth resources, some extra less important services could be transported in the protection path in normal conditions.

2. Network Element A is in charge of detecting the failure state of the links and nodes of the work paths and the protection path in the Metropolitan Area Transport Network, while Network Elements C, D and E are in charge of detecting the failure state of the links connecting each of the elements with the data device, respectively.

3. When there is a failure state or recovery from a failure state in the links or nodes in the Metropolitan Area Transport network, Network Element A could detect a failure state or a recovery from a failure state directly by the overhead alarm of the SDH (e.g., AIS, and LOP). When there is a failure state or recovery from a failure state in the links connecting Network Elements C, D and E to the data devices, Network Elements C, D and E will notify Network Element A via signaling (e.g., the Ethernet OAM signaling, the MPLS OAM signaling and signaling of other protocol modes).

4. After Network Element A detects a failure state of the links or nodes of the work path in the Metropolitan Area Transport Network, or receives the notice that there is a failure state (that is, the work path turns unavailable) from Network Elements D or E, Network Element A switches the services to the protection path, then the extra services transported in the protection path are interrupted. When there are failure states in multiple work paths at the same time, the data service with the highest priority is switched to the protection path.

If there are failure states in the work path and the protection path at the same time, whether Network Element A switches the services into the protection path or not will depend on specific situations.

5. When the failure of the work path is eliminated (that is, the work path becomes available), Network Element A switches the services back to the work path such that the extra services transported in the protection path could continue or services could be switched from another work path which is out of work because of a failure quickly to the protection path.

As can be seen from the foregoing description, in accordance with the embodiment of the present invention, the work destination node detects the link connecting itself with the data device, and notifies the source node when it detects an failure state or recovery from a failure state. As a result, the method of the embodiment of the present invention implements the protection in case of a failure state of the links and the nodes in the Metropolitan Area Transport Network neither depending on the data devices connected neither with the nodes nor on the service type. Furthermore, this method makes it possible to protect the data services when there is a failure state of the destination node or a failure state of the links connecting the destination node to the data device in the Metropolitan Area Transport Network, which satisfies the demand for the protection of important data services.

The forgoing description is just preferred embodiments instead of a limit of the invention. Any changes or modifications can be made without departing from the spirit of the invention and therefore will be covered in the protection scope set in the claims.

What is claimed is:

1. A method for protecting a data service in a Metropolitan Area Transport Network, comprising:
    establishing a work path for transporting a service between a source node and a work destination node of the service in the Metropolitan Area Transport Network (MATN), wherein the source node is a node in the MATN through which the service enters the MATN, the work destination node is a node via which a service in the work path leaves the MATN;
    setting a node other than the work destination node as a protection destination node;
    establishing a protection path between the source node and the protection destination node for protecting the service in the work path, wherein the protection destination node is a node via which a service in the protection path leaves the MATN;
    the source node detecting a failure state of:
        (a) a first path component comprising links of the work path and the protection path, and
        (b) a node in the first path component;
    the work destination node and the protection destination node each detecting a failure state of a second path component comprising the links connecting the work destination node and the protection destination node to at least one data device that is connected to the data network, and if there is the failure, notifying the source node; and switching the data service in the work path to the protection path by the source node upon one or more of the following conditions: (a) when the failure state of the link of the work path or the failure state of the node in the link is detected, and (b) a failure state notice of the work destination node is received;

the source node continuing transmitting the data service in the protection path after the work path recovers from the failure state.

2. The method according to claim 1, wherein, the step of switching comprises:

one protection path providing a protection for multiple work paths; and the work path with the highest priority being switched to the protection path when the multiple work paths are out of work at the same time.

3. The method according to claim 2, wherein the work destination node and the protection destination node are connected to the same data device.

4. The method according to claim 2, wherein the work destination node and the protection destination node are connected to different data devices which are connected with each other.

5. The method according to claim 1, further comprising:

when the work path runs well, the source node transporting extra data services via the protection path, and when the work path is switched to the protection path, stopping the extra data services.

6. The method according to claim 5, wherein the work destination node and the protection destination node are connected to the same data device.

7. The method according to claim 5, wherein the work destination node and the protection destination node are connected to different data devices which are connected with each other.

8. The method according to claim 1, further comprising:

when the source node detects that the failure of the work path has been eliminated or the source node receives a notice that the failure of the work path has been eliminated, switching the services from the protection path to the work path.

9. The method according to claim 8, wherein the work destination node and the protection destination node are connected to the same data device.

10. The method according to claim 8, wherein the work destination node and the protection destination node are connected to different data devices which are connected with each other.

11. The method according to any of claim 1, further comprising:

switching the data service in the protection path to the work path after a failure in the protection path is detected or a failure state notice from the protection destination node is received.

12. The method according to claim 11, wherein the work destination node and the protection destination node are connected to the same data device.

13. The method according to claim 11, wherein the work destination node and the protection destination node are connected to different data devices which are connected with each other.

14. The method according to claim 1, wherein the work destination node and the protection destination node are connected to the same data device.

15. The method according to claim 14, wherein, the step of notifying the source node comprises:

the work destination node and the protection destination node notifying the source node by means of signaling after detecting a failure state of the link; and further comprising:

the work destination node and the protection destination node notifying the source node by means of signaling after detecting a recovery from a failure state.

16. The method according to claim 15, wherein, the work destination node and the protection destination node adopt an confirmation mechanism when notifying the source node by means of signaling, and keep on sending the failure state information to the source node until receiving the confirmation information from the source node.

17. The method according to claim 15, wherein the signaling comprises: Ethernet Operation Administrative and Maintenance (OAM) signaling and Multiprotocol Label Switching (MPLS) OAM signaling.

18. The method according to claim 1, wherein the work destination node and the protection destination node are connected to different data devices which are connected with each other.

19. The method according to claim 18, wherein, the step of notifying the source node comprises:

the work destination node and the protection destination node notifying the source node by means of signaling after detecting an failure state of the link; and further comprising:

the work destination node and the protection destination node notifying the source node by means of signaling after detecting a recovery from a failure state.

20. The method according to claim 19, wherein, the work destination node and the protection destination node adopt an confirmation mechanism when notifying the source node by means of signaling, and keep on sending the failure state information to the source node until receiving the confirmation information from the source node.

21. The method according to claim 19, wherein the signaling comprises: Ethernet Operation Administrative and Maintenance (OAM) signaling and Multiprotocol Label Switching (MPLS) OAM signaling.

* * * * *

UNITED STATES PATENT AND TRADEMARK OFFICE
CERTIFICATE OF CORRECTION

| | | |
|---|---|---|
| PATENT NO. | : 8,416,683 B2 | Page 1 of 1 |
| APPLICATION NO. | : 10/591207 | |
| DATED | : April 9, 2013 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this
Ninth Day of July, 2013

Teresa Stanek Rea
*Acting Director of the United States Patent and Trademark Office*